United States Patent
Bar-Haim et al.

(10) Patent No.: US 12,124,493 B2
(45) Date of Patent: Oct. 22, 2024

(54) GENERATING KEY POINT GRAPHS USING DIRECTIONAL RELATION SCORES

(71) Applicant: International Business Machines Corporation, Armonk, NY (US)

(72) Inventors: Roy Bar-Haim, Ramat Gan (IL); Arie Cattan, Jerusalem (IL); Lilach Eden, Haifa (IL); Yoav Kantor, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/175,071

(22) Filed: Feb. 27, 2023

(65) Prior Publication Data

US 2024/0289374 A1    Aug. 29, 2024

(51) Int. Cl.
- *G06F 16/00* (2019.01)
- *G06F 16/332* (2019.01)
- *G06F 16/35* (2019.01)

(52) U.S. Cl.
CPC ........ *G06F 16/358* (2019.01); *G06F 16/3328* (2019.01); *G06F 16/3329* (2019.01)

(58) Field of Classification Search
CPC . G06F 16/358; G06F 16/3328; G06F 16/3329
USPC ........................................................ 707/737
See application file for complete search history.

(56) References Cited

U.S. PATENT DOCUMENTS

| | | | | |
|---|---|---|---|---|
| 9,710,593 | B1* | 7/2017 | Keller | G06F 30/398 |
| 11,250,719 | B2* | 2/2022 | Deshmukh | G09B 5/12 |
| 2018/0260476 | A1* | 9/2018 | Bar-Haim | G06F 16/93 |
| 2020/0065716 | A1* | 2/2020 | Aharonov | G06N 20/00 |
| 2021/0082144 | A1* | 3/2021 | Kadav | G06T 7/74 |

FOREIGN PATENT DOCUMENTS

| | | |
|---|---|---|
| CN | 114298037 A | 4/2022 |
| JP | 2019139571 A | 8/2019 |
| WO | 2022241913 A1 | 11/2022 |

OTHER PUBLICATIONS

Bar_Haim et al., "Every Bite Is an Experience: Key Point Analysis of Business Reviews", Proceedings of the 59th Annual Meeting of the Association for Computational Linguistics and the 11th International Joint Conference on Natural Language Processing, pp. 3376-3386, Aug. 1-6, 2021.*

Cattan et al, "SciCo: Hierarchical Cross-Document Coreference for Scientific Concepts", In Proceedings of the 48th annual meeting of the Association for Computational Linguistics, pp. 296-305, 2010.*

(Continued)

*Primary Examiner* — Monica M Pyo
(74) *Attorney, Agent, or Firm* — Shackelford, Mckinley & Norton, LLP

(57) ABSTRACT

An example system includes a processor to execute a key point analysis to extract key points from a number of input sentences. The processor can compute directional relation scores between the extracted key points. The processor can construct a key point graph based on the extracted key points and the directional relation scores. The processor can generate a key point graph visualization based on the key point graph.

19 Claims, 8 Drawing Sheets

(56) References Cited

OTHER PUBLICATIONS

Erkan, et al., "LexRank: Graph-based Lexical Centrality as Salience in Text Summarization", Published in Journal of Artificial Intelligence Research, vol. 22, Issue 1, Jul. 2004, 22 pages.

Fatima, Qandeel, "A Graph-Based Approach Towards Automatic Text Summarization", Published in core.ac.uk, Dec. 2017, 116 pages.

Tarau, et al., "Dependency-based Text Graphs for Keyphrase and Summary Extraction with Applications to Interactive Content Retrieval", arxiv.org, Sep. 20, 2019, 10 pages.

* cited by examiner

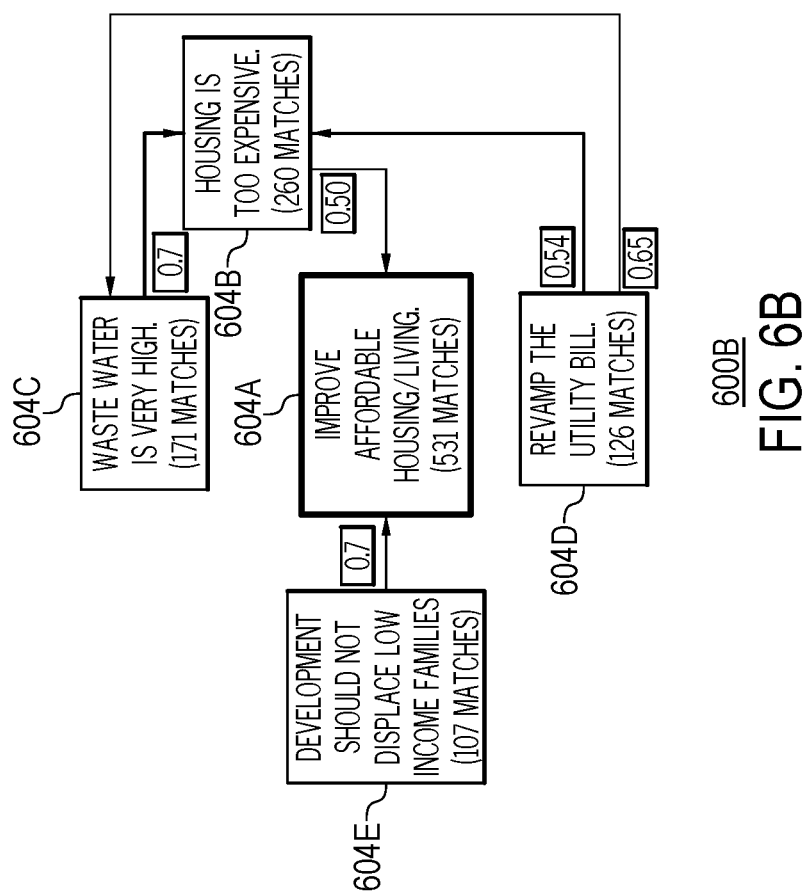

702 — The quality of the food is poor.

704A — The hamburger was tasteless and cold.

704B — Mac and cheese was bland.

704C — French fries were simply awful.; The fries were nothing special.

706A — The fries are too thick and coated.

706B — The first basket of fries were cold.

706C — My French fries were not freshly made.

706D — Fries were over cooked.; The fries were burnt to a crisp.

704D — The drinks were subpar.; Drinks are not worth the money as well.

706E — Drinks were not strong either.

704E — Steak was very under seasoned.

704F — The burger was a mess to eat.

GENERATING KEY POINT GRAPHS USING DIRECTIONAL RELATION SCORES

BACKGROUND

The present techniques relate to automated text summarization. More specifically, the techniques relate to summarization and navigation of large collections of opinions.

SUMMARY

According to an embodiment described herein, a system can include processor to extract key points from a plurality of input sentences. The processor can also further compute directional relation scores between the extracted key points. The processor can also construct a key point graph based on the extracted key points and the directional relation scores. The processor can further generate a key point graph visualization based on the key point graph.

According to another embodiment described herein, a computer-implemented method can include extracting, via a processor, key points from a plurality of input sentences. The method can further include computing, via the processor, directional relation scores between the extracted key points. The method can also further include constructing, via the processor, a key point graph based on the extracted key points and the directional relation scores. The method can also include generating, via the processor, a key point graph visualization based on the key point graph.

According to another embodiment described herein, a computer program product for generating key point graph visualizations can include computer-readable storage medium having program code embodied therewith. The program code executable by a processor to cause the processor to extract key points from a plurality of input sentences. The program code can also cause the processor to compute directional relation scores between the extracted key points. The program code can also cause the processor to construct a key point graph based on the extracted key points and the directional relation scores. The program code can also cause the processor to generate a key point graph visualization based on the key point graph.

BRIEF DESCRIPTION OF THE SEVERAL VIEWS OF THE DRAWINGS

FIGS. 6A and 6B are example key point graphs, generated according to embodiments described herein; and FIG. 7 is an example key point hierarchy, according to embodiments described herein.

DETAILED DESCRIPTION

Figure 1:
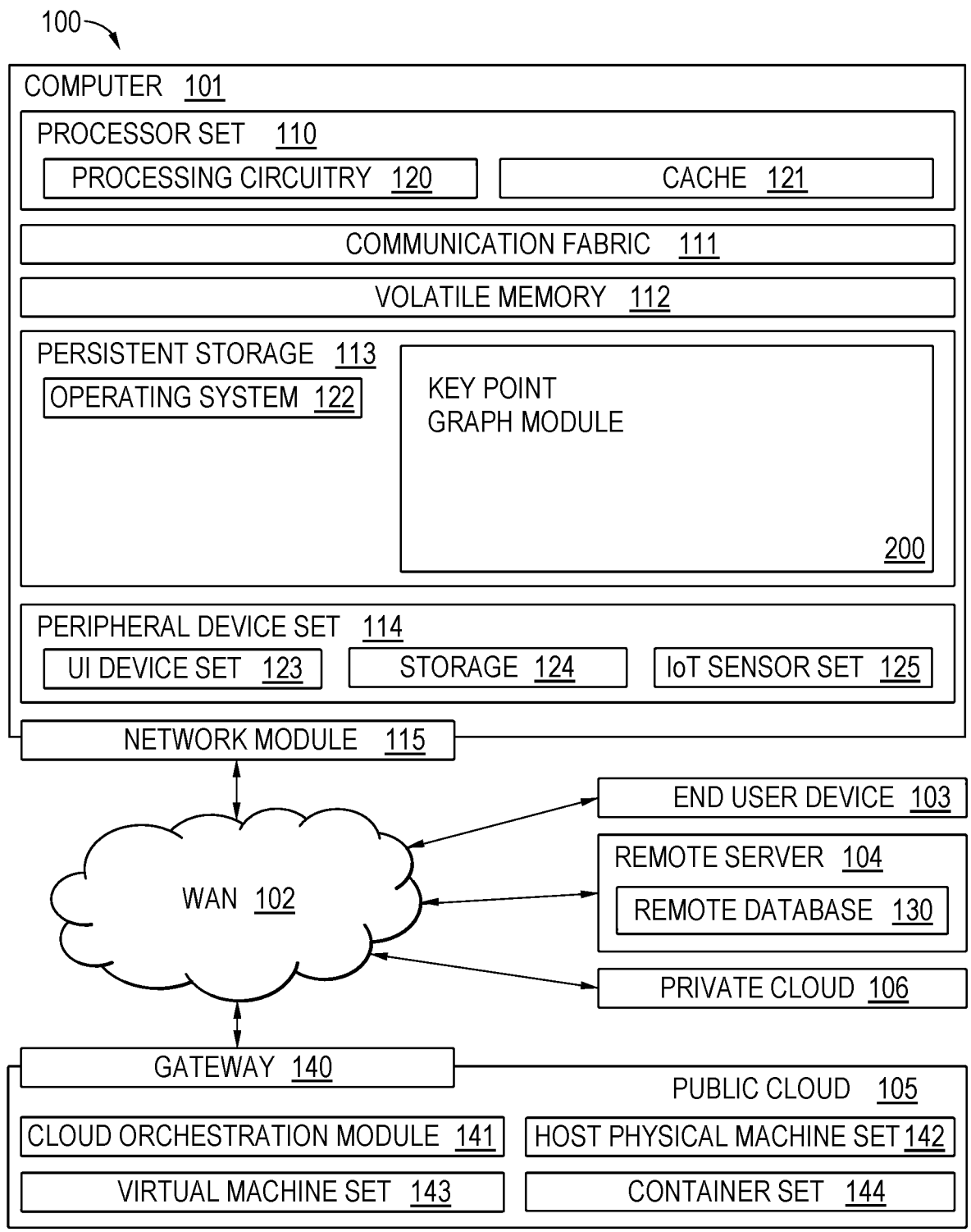
FIG. 1 is a block diagram of an example computing environment that contains an example of an environment for the execution of at least some of the computer code involved in performing the inventive methods, such as a key point graph module.

In various cases, large collections of opinions may need to be effectively summarized. For example, such collections of opinions may be user reviews, survey responses, among other potential collections of opinions. Some systems may use word clouds or key phrases to summarize such collections. For example, a word cloud may summarize opinions by providing a visualization of most common words with the size of the words indicating their relative popularity. Key phrases may provide a list of key phrases found within the collection of opinions with associated confidence scores or relevance scores. However, word clouds and key phrases may be too coarse-grained and inaccurate. For example, word clouds and key phrases may not provide much information about the expressed opinions. In some cases, supervised text classification to a predefined taxonomy may also be used. However, such supervised text classification methods may be static and thus hard to adapt to new domains and emerging topics of opinion. In some cases, a multi-document summarization may be used to generate a textual summary. However, such textual summary may be more informative, but may not be quantitative and also may not be able represent conflicting views very well.

According to embodiments of the present disclosure, an example system includes a processor to execute a key point analysis to extract key points from a number of input sentences. Key Point Analysis (KPA) is performed by applying a machine-learning model for selecting concise, high quality sentences or phrases as key point candidates, then applying a second machine-learning model for matching the input sentences to the key point candidates, and finally selecting the candidates with most matches as the key points, while merging semantically similar key points. The processor can compute directional relation scores between the extracted key points. The processor can construct a key point graph based on the extracted key points and the directional relation scores. The processor can generate a key point graph visualization based on the key point graph. Thus, embodiments of the present disclosure enable efficient and accurate summarization and navigation of large collections of comments or opinions. By first finding the most salient points in the data using KPA, and then constructing a graph from the extracted key points, the techniques enable fully-automatic generation of structured summaries for large collections of opinions, views or arguments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as key point graph module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
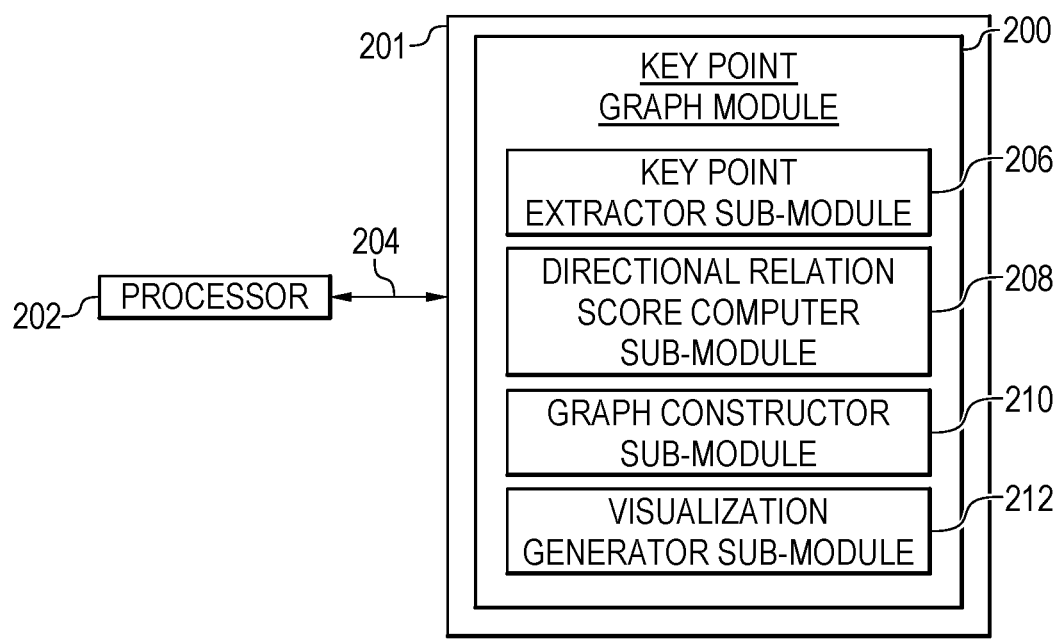
FIG. 2 is an example tangible, non-transitory computer-readable medium that can generate key point graphs using directional relation scores.

Referring now to FIG. 2, a block diagram is depicted of an example tangible, non-transitory computer-readable medium 201 that can generate key point graphs using directional relation scores. The tangible, non-transitory, computer-readable medium 201 may be accessed by a processor 202 over a computer interconnect 204. Furthermore, the tangible, non-transitory, computer-readable medium 201 may include code to direct the processor 202 to perform the operations of the method 300 of FIG. 3.

The various software components discussed herein may be stored on the tangible, non-transitory, computer-readable medium 201, as indicated in FIG. 2. For example, the key point graph module 200 may include a key point extractor sub-module 206 that includes code to extract key points from a number of input sentences. In some examples, the key point extractor sub-module 206 also includes code to execute a key point analysis. The key point graph module 200 may also include a directional relation score computer sub-module 208 that includes code to compute directional relation scores between the extracted key points. In some examples, the directional score between key points i and j predicts the likelihood that a directional relation holds between i and j. That is, that i provides elaboration and support to j. In some examples, the directional relation score computer sub-module 208 further includes code to calculate pairwise local entailment scores. For example, the directional relation score computer sub-module 208 can apply a machine learning classification model that is trained on a related task such as detecting Textual Entailment or Natural Language Inference (NLI) between a pair of texts, for which large-scale training datasets are available. In other implementations, the directional relation score may be computed by the machine learning model of KPA that computes a match score between a sentence and a key point. In various examples, other methods for computing the directional relation score may also include code to create context vector for each key point, where each entry in the vector corresponds to the match score between an input sentence and the key point, and compute an entailment score between each pair of key points by applying a directional distributional similarity method to the context vectors of the key points. Directional distributional similarity methods are described in more detail below. In some examples, the key point graph module 200 may also include a graph constructor sub-module 210 that includes code to construct a key point graph based on the extracted key points and the directional relation scores. In some examples, the graph constructor sub-module 210 also includes code to generate a graph with child nodes connected to one or more parent nodes via one way directional arrows (directed edges). For example, the graph constructor sub-module 210 also includes code to employ a decision threshold over local scores, wherein the decision threshold is tuned over development data. In some examples, the graph constructor sub-module 210 may create a directed graph by selecting directed edges whose local score exceeds the decision threshold. In some examples, the graph constructor sub-module 210 also includes code to construct a key point hierarchy, in which each node in the hierarchy is a cluster of key points conveying similar ideas, and directed edges connect more specific clusters to more general clusters, such that each cluster does not have more than one parent. In some examples, the graph constructor sub-module 210 also includes code to construct a reduced forest. For example, the graph constructor sub-module 210 may create an initial directed graph by selecting directed edges whose local score exceeds the decision threshold. Then, the graph constructor sub-module 210 may also include code to compute a condensation of a directed graph by contracting each strongly connected component into a single vertex that represents a cluster of nodes in the directed graph to generate a directed acyclic graph, and transform the directed acyclic graph into a forest by taking its transitive reduction and heuristically selecting a single parent for each node with multiple parent nodes. In some examples, the graph constructor sub-module 210 also includes code to construct the key point hierarchy includes using a tree-node-fix (TNF) algorithm. The tree-node-fix algorithm may iteratively improve the structure of the initial hierarchy, as measured by some global scoring function, by repeatedly removing and reattaching a single node at a time, to achieve maximal improvement of the scoring function. Similarly, the tree-and-component-fix (TNCF) algorithm reattaches a whole cluster at each step. The TNF and TNCF algorithms are described in greater detail below. In some examples, the graph constructor sub-module 210 also includes code to construct the key point hierarchy using a greedy algorithm. For example, the graph constructor sub-module 210 may also include code to obtain key point clusters by agglomerative clustering with average linkage and a distance threshold, define the score of a directional edge between two clusters as the average of the scores between the key points in the two clusters, and construct the KPH by repeatedly adding a highest-scoring edge and skipping edges that violate a definition of the KPH as a directed forest. In some examples, the graph constructor sub-module 210 also includes code to construct the key point hierarchy using a modified greedy with global score algorithm. For example, the graph constructor sub-module 210 may also include code to consider relations between each cluster and all its ancestors in the resulting KPH. The greedy and the modified greedy algorithms are described in more detail below. The key point graph module 200 may also include a visualization generator sub-module 212 that includes code to generate a key point graph visualization based on the key point graph.

Figure 3:
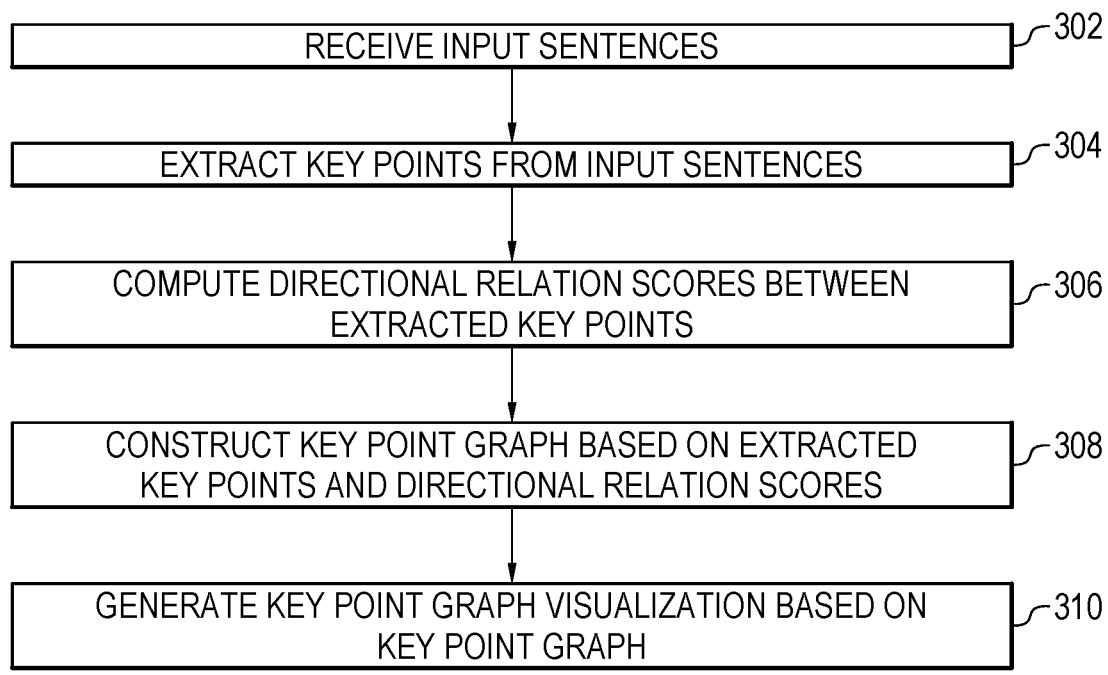
FIG. 3 is a process flow diagram of an example method that can generate key point graphs using directional relation scores.

FIG. 3 is a process flow diagram of an example method that can generate key point graphs using directional relation scores. The method 300 can be implemented with any suitable computing device, such as the computer 101 of FIG. 1. For example, the methods described below can be implemented by the processor set 110 of FIG. 1.

At block 302, input sentences are received. For example, the input sentences may be a collection of opinions to be summarized. In various examples, the input sentences may be from a collection of user reviews, survey responses, among other potential collections of opinions.

At block 304, key points are extracted from the input sentences. For example, a key point analysis may be executed to extract key points from the input sentences. In some examples, a list of key points with a corresponding number of matching sentences may be extracted. In various examples, the list of key points may be ordered by descending number of matching sentences.

At block 306, directional relation scores are computed between the extracted key points. For example, the directional relation scores may be pairwise local entailment scores. The pairwise local entailment scores can be computed by creating a context vector for each key point based on sentence match scores, and applying a directional distributional method to compute an entailment score between each pair of key points, based on their context vectors. In various examples, the directional relation scores can be computed by applying a machine learning classification model that is trained on a related task, such as detecting Textual Entailment or Natural Language Inference (NLI) between a pair of texts. In other implementations, the directional relation score may be computed using a machine learning model of KPA that computes a match score between a sentence and a key point. In various examples, other methods for computing the directional relation score may also create a context vector for each key point, where each entry in the vector corresponds to the match score between an input sentence and the key point, and compute an entailment score between each pair of key points by applying a directional distributional similarity method to the context vectors of the key points. Directional distributional similarity methods are described in more detail below.

At block 308, key point graph is constructed based on the extracted key points and the directional relation scores. In various examples, a graph may be generated with child nodes connected to one or more parent nodes via one way directional arrows representing directed edges. In some examples, a directed graph may be created by selecting directed edges whose local directional score exceeds the decision threshold. In some examples, a global constraint may be incorporated when constructing the key point graph. In various examples, a key point hierarchy may be constructed. For example, a decision threshold may be employed over local scores, wherein the decision threshold is tuned over development data. In some examples, constructing the key point hierarchy includes constructing a reduced forest. For example, a condensation of a directed graph may be computed by contracting each strongly connected component into a single vertex that represents a cluster of nodes in the directed graph to generate a directed acyclic graph. The directed acyclic graph may then be transformed into a forest by taking its transitive reduction and heuristically selecting a parent for each node with multiple parent nodes. In some examples, constructing the key point hierarchy includes applying at least one of the aforementioned algorithms: reduced forest construction, tree-node-fix (TNF), tree-node-and-component-fix (TNCF), greedy algorithm, and modified greedy algorithm. These algorithms are described in greater detail below. In some examples, the key point hierarchy is constructed using a greedy algorithm. For example, key point clusters may be obtained by agglomerative clustering with average linkage and a distance threshold. The score of a directional edge between two clusters may be defined as the average of the scores between the key points in the two clusters. The key point hierarchy may be constructed by repeatedly adding a highest-scoring edge and skipping edges that violate a definition of the key point hierarchy as a directed forest. In some examples, the key point hierarchy is constructed using a modified greedy with global score algorithm. For example, the modified greedy algorithm includes a modification that comprises considering relations between each cluster and all its ancestors in a resulting KPH.

At block 310, a key point graph visualization is generated based on the key point graph. For example, the key point graph visualization may include a key point hierarchy. In some examples, the key point graph visualization includes child nodes connected to at least one parent node via one way directional arrows.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
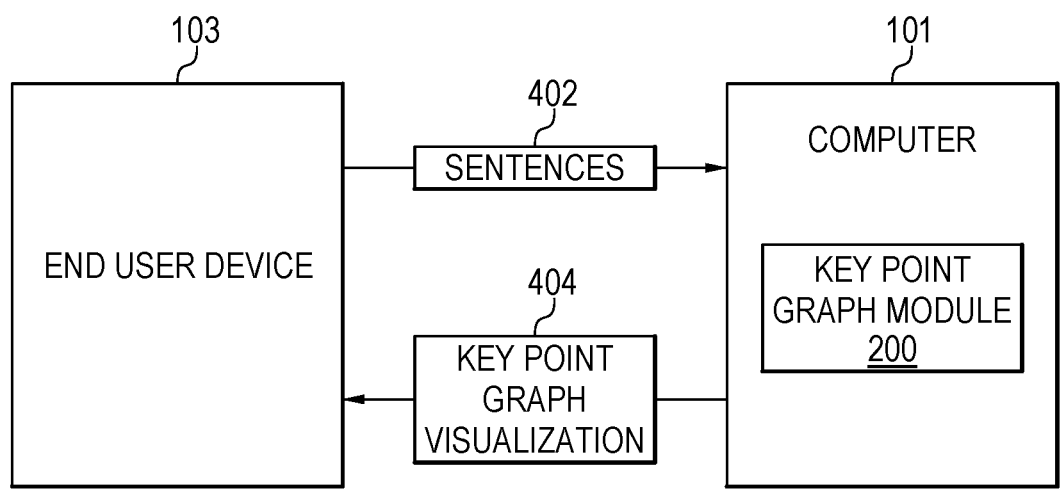
FIG. 4 is a block diagram of an example system for generating key point graphs using directional relation scores.

With reference now to FIG. 4, a block diagram shows an example system for generating key point graphs using directional relation scores. The example system 400 of FIG. 4 includes similarly referenced elements from FIG. 1. In particular, system 400 includes a computer 101 with key point graph module 200 and an end user device 103. The end user device 103 is shown receiving sentences 402 to the computer 101 and receiving key point graph visualization 404 from the computer 101.

In the example of FIG. 4, the end user device 103 may send sentences 402 to the computer 101. For example, the sentences 402 may be from a collection of opinions, such as user reviews, survey responses, etc.

Still referring to FIG. 4, the key point graph module 200 of the computer 101 can extract key points (KPs) from the input sentences 402. In some examples, the key point graph module 200 can execute a key point analysis (KPA) to extract key points from the input sentences 402. Key Point Analysis is a summarization framework that provides both textual and quantitative summary of the main points in a collection of comments. KPA extracts a set of concise, high-quality sentences or phrases, referred to herein as key points, and maps each of the input sentences to its corresponding key points. The prevalence of each key point is quantified as the number of its matching sentences. The KPA summaries are more expressive than commonly-used word clouds and key phrases, while adding an important quantitative dimension that is missing from plain text summaries. The KPA algorithm aims to extract a set of key points that provide high coverage of the data, while removing redundancies. It employs two supervised models: one for assessing the quality of key point candidates, and another one for computing a match score between a sentence and a candidate key point.

As one simple example, the extracted sentences 402 may be from a collection of reviews for a hotel. The key point graph module 200 can extract a list of five key points "air condition was poor", "a lot of renovation work", "staff ripped us off with prices", "Wi-Fi was a bit slow", and "traffic noise in some rooms" with corresponding numbers of matching sentences 39, 32, 11, 8, and 6 from the input sentences 402. Example matching sentences for the "WiFi was a bit slow" key point may be "WiFi was a bit slow", "Wifi service wasn't great and we couldn't actually connect", and "Wifi is ridiculously slow and fiddly to connect using Chrome Breakfast coffee was only average." The output of the key point analysis may thus be a flat list of key points, which may not capture the relationship between the key points nor any hierarchy among the key points.

In various examples, the key point graph module 200 can then predict directional scores between all pairs of extracted key points. As one example, given a pair of key points (i, j), the key point graph module 200 can predict whether a directional relation i→j holds between i and j, by computing a likelihood score $s(i, j) \in [0, 1]$. In various examples, the key point graph module 200 can apply a machine learning classification model that is trained on a related task such as detecting Textual Entailment or Natural Language Inference (NLI) between a pair of texts. In other examples, the directional relation score may be computed by the machine learning model of KPA that computes a match score between a sentence and a key point. In other examples, the key point graph module 200 can use directional distributional similarity to calculate the directional relation scores. The basic idea of directional distributional similarity is that if A entails B, then the typical contexts of A tend to appear also with B. For example, if A and B are words, then the words that co-occur with each word can be considered as contexts, and a context feature vector can be constructed for A (resp. B), where the i-th entry is the Pointwise mutual information of the i-th word with A (resp. B). This approach can be adapted to the case of key points, where the context is represented by the input sentences, and their match score with the key point. In particular, if i→j, it is likely that an input sentence that matches the key point i will also match j. For example, the sentence "The beds were really comfortable, I literally knocked out as soon as my head touched the pillow." matches both "The beds were awesome" and "The rooms are comfortable". Therefore, in various examples, the key point graph module 200 can construct a feature vector for each key point k, whose length is equal to the number of input sentences. The value at the i-th position in this vector is the likelihood that the i-th sentence matches k, as predicted by a KPA matching model. Then, the key point graph module 200 can apply various distributional similarity metrics to predict a directional score s(i, j). Examples of distributional similarity metrics include the Precision (WeedsPrec), Balanced Inclusion (BInc), and the APInc metric. In some examples, the key point graph module 200 can use a simple variant of WeedsPrec, referred to herein as Intersect, to compute the ratio between the number of sentences matched by KPA to both i and j and the number sentences matched to i. In particular, when most of the sentences that were mapped to i were also mapped to j, it is a strong indication that i→j.

The key point graph module 200 can then construct a graph based on the local scores. For example, the key point graph module 200 can construct a Key Point Hierarchy (KPH) by determining its semantic clusters and the hierarchical relations between them. In particular, the key point graph module 200 can generate a KPH such that the set of pairwise key point relations induced by its structure are consistent with the local directional scores: high-scoring relations are included, and low-scoring relations are excluded. In various examples, the key point graph module 200 can employ a decision threshold τ over the local scores, which is to be tuned over some development data. In some examples, the key point graph module 200 can construct a reduced forest. For example, the key point graph module 200 can construct the reduced forest by computing the condensation of an initial directed graph G, which is obtained by taking all the directional edges whose relation score is above the threshold. The condensation may be computed by contracting each strongly connected component into a single vertex that represents a cluster of nodes in the directed graph G. The key point graph module 200 can transform the resulting Directed Acyclic Graph (DAG) into a forest by taking its transitive reduction, and then heuristically selecting a single parent for each node with multiple parents. The key point graph module 200 can select the larger cluster as a parent. As a tie breaker, key point graph module 200 can use the mean over all the pairwise scores s(i, j) such that i is in the child cluster and j is in the parent cluster. G is a Forest Reducible Graph (FRG) if after taking the transitive reduction, none of the nodes has multiple parents.

In some examples, the key point graph module 200 can use a Tree-Node-and Component-Fix (TNCF) algorithm. For example, given a directed graph with local edge weights that are either positive (predicting pairwise entailment between connected nodes) or negative (predicting non-entailment), the optimal entailment graph may be defined as the transitive subgraph in which the sum of the edge weights is maximized. However, this problem is NP-Hard, even when further constraining the resulting graph to be forest-reducible. Therefore, to address the computational complexity of finding an exact solution, an approximation algorithm, termed Tree-node fix (TNF) can be applied. TNF generates forest-reducible entailment graphs, whose quality has been shown empirically to be close to the exact solution found via Integer Linear Programming (ILP). In particular, starting from some initial FRG, the TNF algorithm iteratively improves the graph objective function by removing and reattaching one node at a time, while keeping the graph forest-reducible. In various examples, the key point graph module 200 can use an extension for this algorithm, referred to as TNCF, where in each iteration a whole cluster may be re-attached, in addition to individual nodes. Since a KPH is also a forest of clusters, the key point graph module 200 may use either of the TNF and TNCF algorithms. For example, the edge weights may be defined as wi,j=s(i, j)−τ so that local scores below the threshold τ are considered negative. For initialization, the key point graph module 200 can start with the reduced forest described above, constructed with the same threshold τ.

In some examples, the key point graph module 200 can alternatively use a Greedy algorithm to construct the KPH. For example, the key point graph module 200 can first obtain key point clusters by agglomerative clustering with average linkage and distance threshold of 1−τ, where the distance metric between two key points i and j is defined as 1−min (s(i, j), s(j, i)). The score of the directional edge between two clusters (C1, C2) can be defined as the average of the s(i, j) scores between the key points in the two clusters:

$$S(C_1, C_2) = \frac{1}{|C_1| \cdot |C_2|} \sum_{i \in C_1} \sum_{j \in C_2} s(i, j) \qquad \text{Eq. 1}$$

In various examples, the KPH is constructed by repeatedly adding the highest-scoring edge if the score is above the τthreshold, and skipping edges that would violate the definition of the KPH as a directed forest. The process is terminated when no more edges can be added. Unlike the TNF and TNCF algorithms, the Greedy algorithm does not modify existing clusters and edges in each iteration, but only adds new edges.

In some examples, the key point graph module 200 can alternatively use a Greedy with Global Score (Greedy GS) algorithm to construct the KPH. One limitation of the Greedy algorithm is that the edge scoring function is local and hence ignores indirect relations between clusters that would result from adding the edge. For example, consider a KPH with three clusters {A, B, C} such that B→A. The criterion to add the edge C→B may consider only S(C, B) but may not consider S(C, A). To address this issue, the key point graph module 200 can use a modified algorithm to consider the relations between each cluster and all its ancestors in the resulting KPH, as follows:

$$E_{k+1} = E_k \cup \underset{e \in E* \setminus E_k}{\mathrm{argmax}}\, O(v, E_k \cup e) \qquad \text{Eq. 2}$$

$$O(v, \varepsilon) = \sum_{C_i \in v} \sum_{C_j \in A_{v,\varepsilon}(C_i)} s(C_i, C_j) \qquad \text{Eq. 3}$$

where $E_k$ is the set of edges in the resulting KPH after k iterations, E* is the set of all edges scoring above τ and $A_{v,\varepsilon}(C)$ denotes the set of ancestors of C in $H(v,\varepsilon)$.

It is to be understood that the block diagram of FIG. 4 is not intended to indicate that the system 400 is to include all of the components shown in FIG. 4. Rather, the system 400 can include fewer or additional components not illustrated in FIG. 4 (e.g., additional computers, end user devices, or additional sentences, visualizations, etc.).

Figure 5:
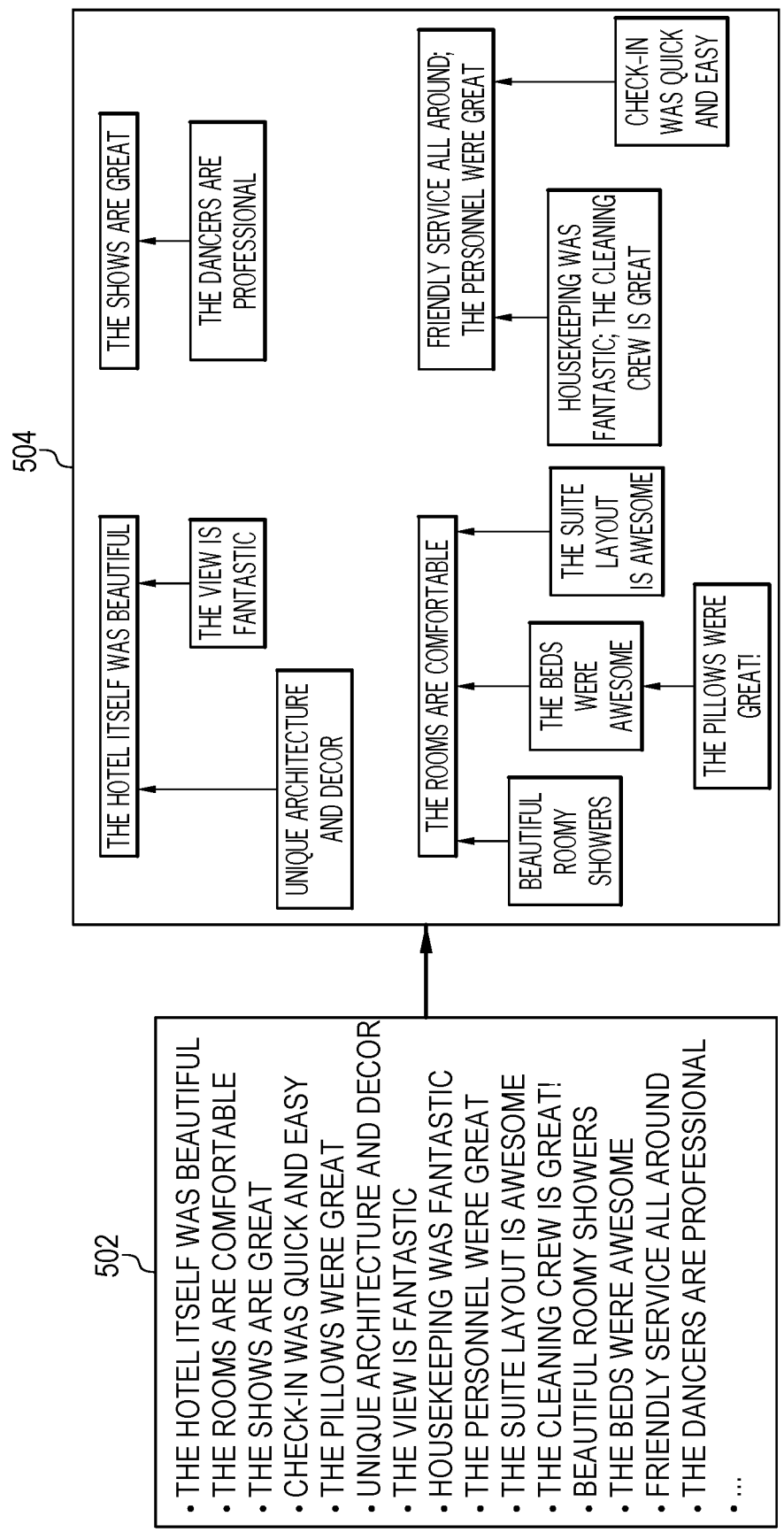
FIG. 5 is a flow diagram of an example process for generation of a key point hierarchy from a set of example keypoints, according to embodiments herein.

FIG. 5 is flow diagram of an example process for the generation of a key point hierarchy from a set of example keypoints, according to embodiments herein. The example process 500 of FIG. 5 shows the generation from a flat list of key points 502 a key point hierarchy (KPH) 504. The example set of key points 502 in FIG. 5 was automatically extracted from reviews of one of the hotels in the Yelp Open Dataset. As shown in FIG. 5, the resulting key points 502 do not provide a high level view of the main themes expressed in the reviews. Moreover, it is hard to tell which key points 502 convey similar ideas, and which of the key points 502 support and elaborate on a more general key point. Moreover, as the number of key points 502 in a summary increases, such an output may become even harder to consume.

In the example KPH 504, nodes group together key points that roughly express the same idea and directed edges connect specific key points to more general ones. The structured KPH 504 representation of opinion summaries organizes the key points in a hierarchy that allows a user to quickly grasp the high-level themes in the summary (the hotel is beautiful, the shows are great, comfortable rooms, great service), and drill down on each theme to get more fine-grained insights. For example, more fine-grained insights include "The personnel were great" and "check-in was quick and easy". Furthermore, key points 502 that (nearly) convey the same meaning (e.g., "House-keeping was fantastic", and "The cleaning crew is great") are clustered together and represented as a single node in the hierarchy of the KPH 504. This structured output makes KPH 504 results more consumable, informative, and easier to navigate. In the example KPH 504 of FIG. 5, the number of matches for each key point is omitted, but may be included in various examples.

For example, given a list of key points $K=\{k_1, k_2, \ldots, k_n\}$, a KPH may be defined as H=(V, E) as a directed forest. In particular, H is a directed acyclic graph where each node has no more than one parent. In various examples, the vertices V in KPH H are clusters of key points $\{C_1, \ldots, C_m\}$ that convey similar ideas, and the directed edges $\epsilon_{ij} \in \varepsilon$ represent hierarchical relations between clusters $C_i$ and $C_j$. A directed edge $C_i \rightarrow C_j$ indicates that the key points in Ci provide elaboration and support for the key points in $C_j$. By the property of transitivity, this relation extends to any two clusters $C_i$ and $C_k$ such that there is a directed path in H from $C_1$ to $C_k$, which we denote as $C_i \leadsto C_k$. Accordingly, R(H) may be defined as the set of directional relations between pairs of key points (x, y) that can be derived from H as:

$$\mathcal{R}(H) = \{(x, y) \mid C_x = C_y \vee C_x \leadsto C_y\} \qquad \text{Eq. 4}$$

where $C_x, C_y \in V$ are the clusters of x and y respectively. In the example of FIG. 5, $\mathcal{R}$(H) includes the relations "Housekeeping was fantastic"→"The personnel were great", "House keeping was fantastic"→"Friendly service all around", "Housekeeping was fantastic"→"The cleaning crew is great", and so on. In various examples, a hierarchical representation may be used over a more general graph structure since it results in a simpler output that is easier to consume.

Figure 6A:
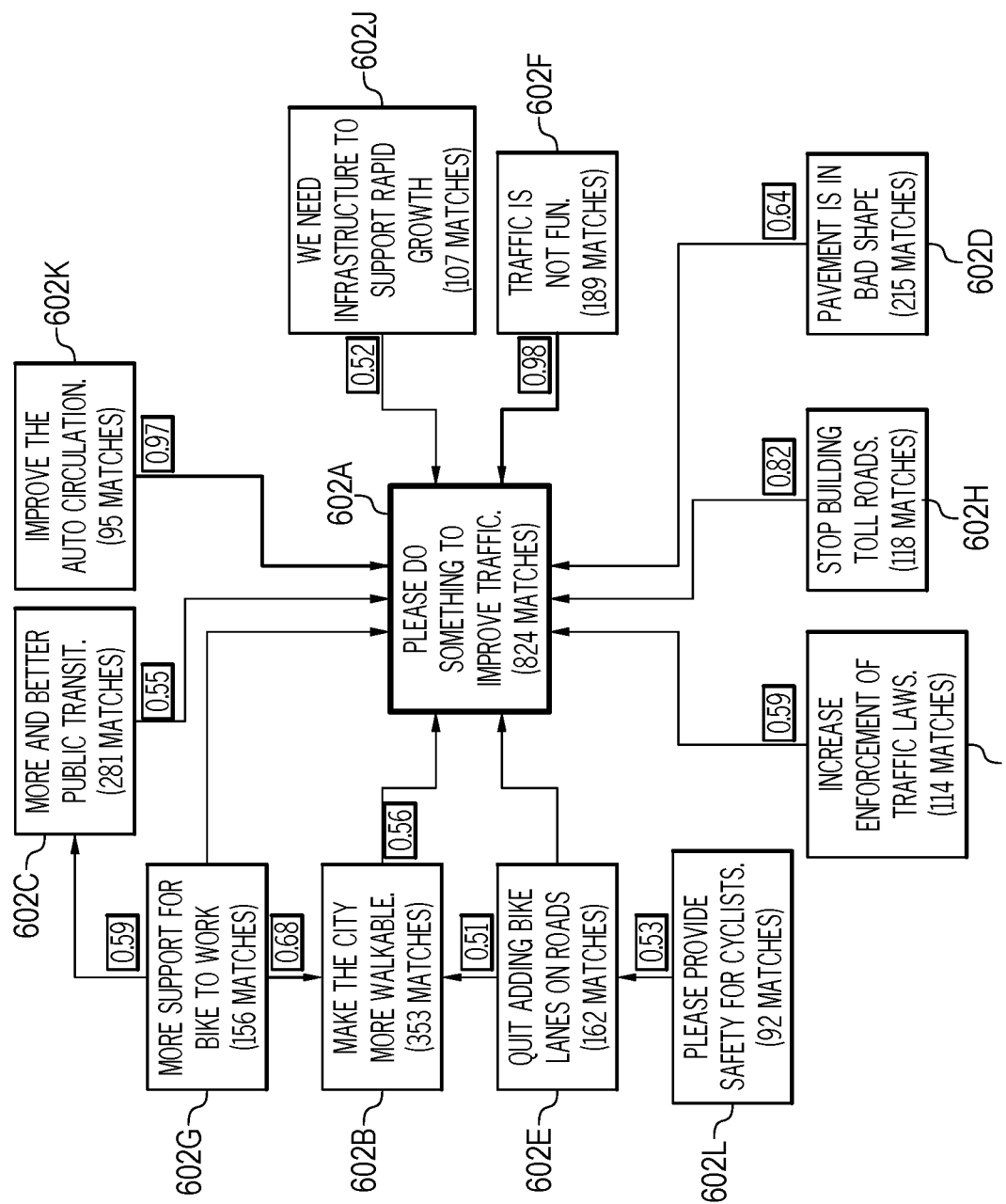

FIGS. 6A and 6B are example key point graphs, generated according to embodiments described herein. For example, the graph 600A of FIG. 6A was built from feedback for a city. The graph 600A includes a main key point 602A of "please do something to improve traffic" associated with 824 sentences. The graph 600A further includes a second key point 602B of "make the city more walkable" associated with 353 sentence matches. The graph 600A similarly includes additional key points 602C-602L with associated numbers of matching sentences. Each of the key points 602A-602L is connected to at least one of the other key points 602A-602L with an arrow having thickness correlated to a corresponding score between each key point pair connected by the arrow. In particular, each of the key points 602B-602L are connected to one or more parent key points.

The graph 600B of FIG. B includes key points associated with a parent key point 604A of "improve affordable housing/living". For example, key point 604B of "housing is too expensive" may include 260 matching opinions. Key point 604C of "waster water cost is very high" may be associated with 171 matches. Key point 604D of "revamp the utility bill" is associated with 126 matching opinions, and key point 604E "development should not displace low income families" is associated with 107 matching opinions. As shown in FIG. 6B, a second major general opinion of feedback for a town represented by parent key point 604A may be related to affordable housing. The associated opinions 604B-604E may thus provide valuable specific information related to this general opinion represented by parent key point 604A that can be used to improve conditions.

FIG. 7 is an example key point hierarchy 700. The example key point hierarchy 700 includes a number of hierarchies with a first key point 702 at the top level of the hierarchy, the key points 704A, 704B, 704C, 704D, 704E, and 704F at the second level of the hierarchy, and key points 706A, 706B, 706C, 706D, and 706E at the third level of the hierarchy. Key points 702, 704C, and 704D are also shown as nodes representing more general parent key points under which groups of one or more other more specific key points are organized.

As shown in FIG. 7, the key point hierarchy 700 may have been constructed from a set of sentences may have been received relating to reviews of a food establishment. The node key point 702 indicates a parent key point expressing the overall general opinion that "the quality of the food is poor". Key points 704A and 704B indicate more specific feedback: "the hamburger was tasteless and cold" and "Mac and cheese was bland", respectively. Key points clusters 704C and 704D provide opinions associated with additional details, such as that the "French fries were simply awful; the fries were nothing special" and "the drinks were subpar; Drinks are not worth the money as well", respectively. Each of the nodes 704C and 704D have further additional key points expressing more details related to these opinions.

Keypoints 704E and 704F indicate additional opinions that the "steak was very under seasoned" and "the burger was a mess to eat." The key point hierarchy 700 provides a structured summary, which allows the user to easily receive overall feedback as well as drill down to more specific feedback.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory for storing a computer program for generating key point graphs; and
   a processor connected to the memory, wherein the processor is configured to execute program instructions of the computer program comprising:
   extracting key points from a plurality of input sentences;
   computing directional relation scores between the extracted key points by performing one of the following selected from the group consisting of: creating a context vector for each key point based on sentence match scores and applying a directional distribution method to compute an entailment score between each pair of key points based on their context vectors, applying a machine learning classification model that is trained on a related task, and using a machine learning model of key point analysis that computes a match score between a sentence and a key point;
   constructing a key point graph based on the extracted key points and the directional relation scores; and
   generating a key point graph visualization based on the key point graph;
   wherein an output of the key point analysis is a flat list of key points, wherein the processor is further configured to execute program instructions of the computer program comprising:
   generating a key point hierarchy from the flat list of key points, wherein the key point hierarchy is a directed acyclic graph, wherein vertices of the directed acyclic graph are clusters of key points and directed edges of the directed acyclic graph represent hierarchical relations between the clusters of key points.

2. The system of claim 1, wherein the processor is to execute the key point analysis to extract the key points from the plurality of input sentences.

3. The system of claim 1, wherein the key point graph visualization comprises a key point hierarchy.

4. The system of claim 1, wherein the key point graph visualization comprises child nodes connected to at least one parent node via one way directional arrows.

5. The system of claim 1, wherein the directional relation scores comprise pairwise local entailment scores.

6. The system of claim 5, wherein the processor is to compute the pairwise local entailment scores by creating a context vector for each key point based on sentence match scores, and apply a directional distributional method to compute an entailment score between each pair of key points, based on their context vectors.

7. A computer-implemented method, comprising:
   extracting, via a processor, key points from a plurality of input sentences;
   computing, via the processor, directional relation scores between the extracted key points by performing one of the following selected from the group consisting of: creating a context vector for each key point based on sentence match scores and applying a directional distribution method to compute an entailment score between each pair of key points based on their context vectors, applying a machine learning classification model that is trained on a related task, and using a machine learning model of key point analysis that computes a match score between a sentence and a key point;
   constructing, via the processor, a key point graph based on the extracted key points and the directional relation scores; and
   generating, via the processor, a key point graph visualization based on the key point graph;
   wherein an output of the key point analysis is a flat list of key points, wherein the method further comprises:
   generating a key point hierarchy from the flat list of key points, wherein the key point hierarchy is a directed acyclic graph, wherein vertices of the directed acyclic graph are clusters of key points and directed edges of the directed acyclic graph represent hierarchical relations between the clusters of key points.

8. The computer-implemented method of claim 7, wherein extracting the key points comprises executing the key point analysis.

9. The computer-implemented method of claim 7, wherein the key points are extracted from the plurality of input sentences using the key point analysis that employs a first supervised model for assessing a quality of key point candidates and a second supervised model for computing a match score between a sentence and a candidate key point.

10. The computer-implemented method of claim 7, wherein constructing the key point graph comprises generating a graph with child nodes connected to one or more parent nodes via one way directional arrows representing directed edges.

11. The computer-implemented method of claim 7, wherein constructing the key point graph comprises constructing the key point hierarchy.

12. The computer-implemented method of claim 11, wherein constructing the key point hierarchy comprises creating a directed graph by selecting directed edges whose local directional score exceeds a decision threshold.

13. The computer-implemented method of claim 11, wherein constructing the key point hierarchy comprises constructing a reduced forest, wherein constructing the reduced forest comprises:
   computing a condensation of a directed graph by contracting each strongly connected component into a single vertex that represents a cluster of nodes in the directed graph to generate the directed acyclic graph; and
   transforming the directed acyclic graph into a forest by taking its transitive reduction and heuristically selecting a parent for each node with multiple parent nodes.

14. The computer-implemented method of claim 11, wherein constructing the key point hierarchy comprises using a tree-node-fix (TNF).

15. The computer-implemented method of claim 11, wherein constructing the key point hierarchy comprises using a tree-node-and-component-fix (TNCF).

16. The computer-implemented method of claim 11, wherein constructing the key point hierarchy comprises using a greedy algorithm comprises:
- obtaining key point clusters by agglomerative clustering with average linkage and a distance threshold;
- defining the score of a directional edge between two clusters as the average of the scores between the key points in the two clusters; and
- constructing the key point hierarchy by repeatedly adding a highest-scoring edge and skipping edges that violate a definition of the key point hierarchy as a directed forest.

17. The computer-implemented method of claim 11, wherein constructing the key point hierarchy comprises using a modified greedy algorithm comprising a modification that comprises considering relations between each cluster and all its ancestors in a resulting key point hierarchy.

18. A computer program product for generating key point graph visualizations, the computer program product comprising a computer-readable storage medium having program code embodied therewith, the program code executable by a processor to cause the processor to:
- extract key points from a plurality of input sentences;
- compute directional relation scores between the extracted key points by performing one of the following selected from the group consisting of: creating a context vector for each key point based on sentence match scores and applying a directional distribution method to compute an entailment score between each pair of key points based on their context vectors, applying a machine learning classification model that is trained on a related task, and using a machine learning model of key point analysis that computes a match score between a sentence and a key point;
- construct a key point graph based on the extracted key points and the directional relation scores; and
- generate a key point graph visualization based on the key point graph;
- wherein an output of the key point analysis is a flat list of key points, wherein the program code executable by the processor further causes the processor to:
- generate a key point hierarchy from the flat list of key points, wherein the key point hierarchy is a directed acyclic graph, wherein vertices of the directed acyclic graph are clusters of key points and directed edges of the directed acyclic graph represent hierarchical relations between the clusters of key points.

19. The computer program product of claim 18, further comprising program code executable by the processor to extract the key points using the key point analysis.

* * * * *